United States Patent
Sullivan et al.

(10) Patent No.: US 12,340,520 B2
(45) Date of Patent: Jun. 24, 2025

(54) SYSTEM AND METHOD FOR MOTION PREDICTION IN AUTONOMOUS DRIVING

(71) Applicant: Mitsubishi Electric Research Laboratories, Inc., Cambridge, MA (US)

(72) Inventors: Alan Sullivan, Middleton, MA (US); Siheng Chen, Cambridge, MA (US); Jun Wang, Greenbelt, MD (US); Xiaolong Li, Blacksburg, VA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 491 days.

(21) Appl. No.: 17/659,889

(22) Filed: Apr. 20, 2022

(65) Prior Publication Data
US 2023/0342944 A1     Oct. 26, 2023

(51) Int. Cl.
    *G06T 7/20*     (2017.01)
    *B60W 60/00*     (2020.01)
    *G06V 10/80*     (2022.01)
    *H04N 19/43*     (2014.01)

(52) U.S. Cl.
    CPC ........... *G06T 7/20* (2013.01); *B60W 60/0027* (2020.02); *G06V 10/806* (2022.01); *H04N 19/43* (2014.11); *G06T 2207/10028* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 2019/0087979 | A1* | 3/2019 | Mammou | H04N 19/597 |
| 2020/0021844 | A1* | 1/2020 | Yea | H04N 19/124 |
| 2020/0151512 | A1* | 5/2020 | Corral-Soto | G06F 18/217 |
| 2021/0073997 | A1* | 3/2021 | Vora | G06V 20/49 |
| 2021/0150231 | A1* | 5/2021 | Kehl | G06N 3/04 |
| 2022/0084229 | A1* | 3/2022 | Guizilini | G06T 3/18 |

OTHER PUBLICATIONS

S. Yuan, X. Li, A. Tzes and Y. Fang, "3DMotion-Net: Learning Continuous Flow Function for 3D Motion Prediction," 2020 IEEE/RSJ International Conference on Intelligent Robots and Systems (IROS), Las Vegas, NV, USA, 2020, pp. 8154-8160, doi: 10.1109/IROS45743.2020.9341671.*

Lu, Fan et al. "MoNet: Motion-based Point Cloud Prediction Network", arXiv:2011.10812v1 [cs.CV] Nov. 21, 2020.*

* cited by examiner

*Primary Examiner* — Jiangeng Sun
(74) *Attorney, Agent, or Firm* — Gene Vinokur

(57) ABSTRACT

The present disclosure provides a system and a method for motion prediction for autonomous driving. The system disclosed herein provides an efficient deep-neural-network-based system to jointly perform perception and motion prediction from 3D point clouds. This system is able to take a pair of LiDAR sweeps as input and outputs for each point in the second sweep, both a classification of the point into one of a set of semantic classes, and a motion vector indicating the motion of the point within the world coordinate system. The system includes a spatiotemporal pyramid network, which extracts deep spatial and temporal features in a hierarchical fashion. The training of this system is regularized with spatial and temporal consistency losses. Thus providing an improved motion planner for autonomous driving applications.

20 Claims, 11 Drawing Sheets

SYSTEM AND METHOD FOR MOTION PREDICTION IN AUTONOMOUS DRIVING

TECHNICAL FIELD

The present disclosure relates generally to autonomous driving systems, and more specifically to a system and a method for neural network-based motion prediction.

BACKGROUND

Autonomous driving utilizes sensing technology for robust dynamic object perception, and sequentially uses various perception sensors for reliable and safe vehicle decision-making. Among the various perception sensors, camera and Lidar are the two dominant sensors used for surrounding object recognition. The camera provides semantically rich visual features of traffic scenarios, while the Lidar provides high-resolution point clouds that can determine the distance of objects.

It may be understood by those familiar with the art, that determining the environmental states is critical for deploying autonomous vehicles (AVs). Accurate environmental state information of the AV is useful in facilitating motion planning and in providing a smooth user experience. The estimation of the environmental state of the AV typically comprises two tasks: (1) perception, which identifies the foreground objects from the background; and (2) motion prediction, which predicts the future trajectories of objects, such as the foreground objects. In the past years, various methods have been developed to handle these two tasks independently or jointly with the aid of deep learning.

Traditional approaches to the perception of the environment mainly rely on bounding box detection technology, which is implemented through 2D object detection based on camera data, 3D object detection based on LiDAR data, or fusion-based detection. The detected bounding boxes are then fed into an object tracker, followed by a motion predictor. Some recent works implement all these modules into an end-to-end framework, which directly produces bounding boxes along with future trajectories.

However, these state estimation strategies tend to fail in open-set scenarios of real traffic due to the dependency on object detection. In particular, the object detectors are difficult to generalize to classes (in deep learning) that have never been present in the training set, consequently leading to failures for the downstream estimation modules.

Some alternative solutions to environmental state detection and motion prediction include representing the 3D environmental information by using an occupancy grid map (OGM). An OGM discretizes a 3D point cloud of the environment into equal 2D grid cells, each of which contains the belief that the corresponding space is occupied by at least one point. With this design, OGMs can be used to specify the drivable space into the future and thereby provide support for motion planning. However, one major weakness of OGM is the difficulty to find the correspondence between the 2D grid cells across time. This makes it difficult to explicitly model the dynamics of objects, which are largely time dependent. In addition, the object category information is typically discarded in OGMs, and thus it is impossible to consider category-specific constraints on the motions of traffic actors for relationship understanding.

Another extension of OGM is to represent the world state in a bird's eye view (BEV) map where each OGM cell additionally includes information about cell motion and cell category, but not information about the motion or category of specific objects. While BEV is an improvement over OGM, the use of a fixed grid of cells leads to discretization errors where the continuous nature of the environment is not accurately captured. More specifically, a BEV cell might contain points from multiple separate objects that each have a different category and/or motion. By assigning the same values of category and motion to every point in a cell such a system fails to correctly represent the true state of the world.

Therefore, there is a recognition of a need for improved systems and methods for more accurate motion prediction and state estimation for motion of objects, such as AVs.

SUMMARY

To that end, it is an object of some embodiments to address the above-mentioned problems in context of autonomous driving.

Some embodiments are based on a recognition that there is a need for a point-cloud motion sensor for estimating motion information of at least some points of environment without the approximation of the point clouds. This is because the approximation of the point clouds by their projection on 2D grid of cells or BEVs is disadvantageous for various traffic assistance and control applications such as controlling an autonomous device, e.g., an AV or a robot, traffic estimation, anomaly detection, generation of crosswalk warnings, and scheduling a traffic light. For example, a bicycle at a distance from a controlled vehicle can be represented by just a few points, and approximation of these few points in a grid or BEV map can remove the important information.

To that end, it is an object of some embodiments to provide motion information for each point of the input 3D point clouds. Examples of the motion information of a point include a classification of the point as static or dynamic, a displacement vector showing a displacement of the point from the previous to a current point cloud, a prediction vector showing a prediction of the motion of the point from the current point cloud to the next point cloud.

Some embodiments are based on an understanding that at least two obstacles are preventing the implementation of these objectives. First, there could be too many points in the 3D point clouds such that processing all points and their temporal relationships to each other is computationally expensive and even prohibitive. Second, the temporal correlation between corresponding points in different 3D point clouds indicative of its motion is difficult to provide. For example, it is possible to use some techniques borrowed from optical and fluid analysis to find point correspondence, but these techniques are again computationally expensive.

To that end, it is an object of some embodiments to provide a system and a method suitable for finding the point correspondences across time by leveraging a time-invariant spatial neighboring space and extract spatiotemporal features in a computationally efficient manner and without the need for establishing the correspondence between points in the subsequent 3D point clouds.

Some embodiments are based on the realization that it is possible to replace point-to-point correspondence and comparison of different corresponding points with location-to-location correspondence of the neighborhoods of a point of interest at different instances of time. To that end, comparing the features of the neighborhoods of the point allows performing local feature comparison in time and space without the need to establish corresponding points. This is because in the case of point clouds, the corresponding points are likely to fall within the neighborhoods and the comparison can be performed on the features of the neighborhoods, as contrasted with the feature of individual points. This provides computational complexity reduction, which is advantageous in time-sensitive applications like real-time autonomous driving applications.

To that end, some embodiments disclose a motion sensor that includes an encoder that encodes spatiotemporal features of each point of a current 3D point cloud, and a decoder that decodes the spatiotemporal encoding of each point to produce motion information. The encoding is performed in two steps. In the first step, only spatial features of individual 3D point clouds are considered in a local neighborhood of a location corresponding to a location of a point of interest in the current 3D point cloud. Some embodiments are based on a recognition that these features are local and determined for each point cloud independently, therefore the computational expense is bounded. Also, because the features are determined for a neighborhood of the location of the point and not for the corresponding points, there is no need to establish such point-to-point correspondence. Hence, the first steps compute spatial encodings of the features of the neighborhood region of the current point in the current 3D frame at different instances of time.

Next, during the second step, the spatial encodings of the features at different instances of time are combined together to produce spatiotemporal encoding of the point in the current 3D point cloud. Hence, the temporal correlation is agnostic to the estimation of corresponding pixels. In other words, the temporal correlation is not pixel-based, but location-based. Some embodiments are based on the realization that computing in such a manner reduces the computational requirements for determining such spatiotemporal encodings for all points in the current 3D point cloud.

Various embodiments are based on the recognition that the ability to reliably perceive the environmental states, particularly the existence of objects and their motion behavior, is crucial for autonomous driving. To that end, some embodiments provide an efficient deep-neural-network-based system to jointly perform perception and motion prediction from 3D point clouds. This system is able to take a pair of LiDAR sweeps as input, and outputs for each point in the second sweep, both a classification of the point into one of a set of semantic classes, and a motion vector indicating the motion of the point within the world coordinate system.

Some embodiments provide a spatiotemporal pyramid network as part of a motion estimator, which extracts deep spatial and temporal features of an input 3D point cloud in a hierarchical fashion. To enforce the smoothness of predictions over both space and time, the training of this system is further regularized with novel spatial and temporal consistency losses. The proposed system can serve as a backup to the bounding-box-based systems known in the art and provide complementary information to a motion planner in autonomous driving applications.

According to an embodiment, a point-cloud motion sensor for estimating motion information of at least some points of environment is provided. The motion sensor comprises a depth sensor, for example a lidar, configured to sense a dynamic environment to collect a temporal sequence of three-dimensional (3D) point clouds of the environment including a current 3D point cloud and a previous 3D point cloud. The motion sensor further comprises a motion estimator operatively connected to the depth sensor via one or a combination of wired and wireless communication channels. The motion estimator is configured to process iteratively the sequence of 3D point clouds with a neural network. The neural network includes an encoder for providing a spatiotemporal encoding of each point in each of the 3D clouds, and a decoder for decoding the spatiotemporal encodings to generate motion information for each point of each of the 3D clouds. To encode a current point of the current 3D point cloud, the encoder is configured to extract features of neighboring points in the current 3D point cloud located in proximity to a location of the current point to produce a current spatial encoding of the current point in the current frame. The encoder is further configured to extract features of neighboring points in the previous 3D point cloud located in proximity to a location in the previous 3D point cloud corresponding to the location of the current point to produce a previous spatial encoding of the current point in the previous frame. The encoder is further configured to combine the current spatial encoding and the previous spatial encoding to produce a spatiotemporal encoding of the current point.

According to another embodiment, a computer-implemented method for estimating motion information of at least some points of environment is provided. The method comprises sensing a dynamic environment to collect a temporal sequence of three-dimensional (3D) point clouds of the environment including a current 3D point cloud and a previous 3D point cloud. The method further comprises estimating iteratively, the motion information of the sequence of 3D point clouds with a neural network. The neural network including an encoder providing a spatiotemporal encoding of each point in each of the 3D clouds, and a decoder decoding the spatiotemporal encodings to generate motion information for each point of each of the 3D clouds. The encoder is configured to extract features of neighboring points in the current 3D point cloud located in proximity to a location of the current point to produce a current spatial encoding of the current point in the current frame. The encoder is further configured to extract features of neighboring points in the previous 3D point cloud located in proximity to a location in the previous 3D point cloud corresponding to the location of the current point to produce a previous spatial encoding of the current point in the previous frame. The encoder is further configured to combine the current spatial encoding and the previous spatial encoding to produce a spatiotemporal encoding of the current point. The method then includes outputting the estimated motion information.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
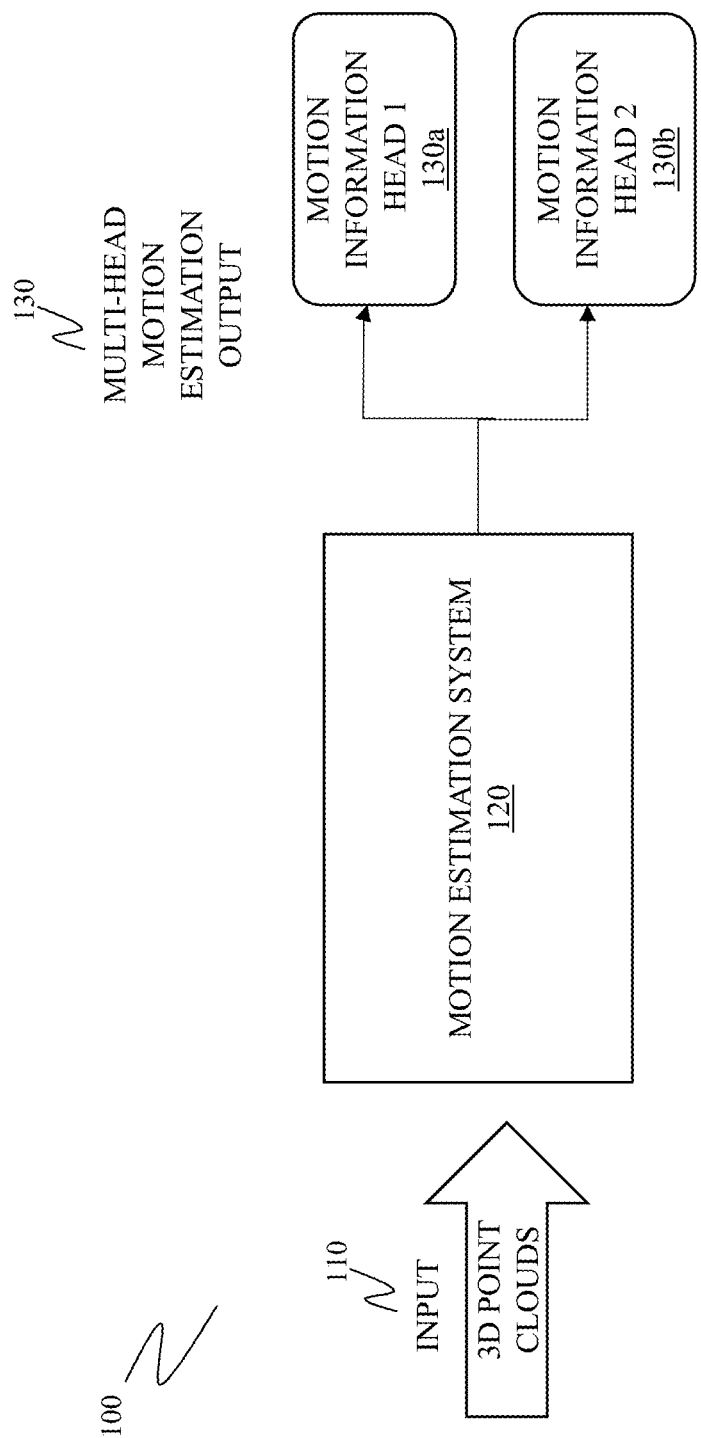
FIG. 1 shows a block diagram of a motion estimation system for motion information estimation of 3D-point clouds, according to an embodiment of the present disclosure.

FIG. 1 shows a block diagram of point-cloud motion sensor 100 including a motion estimation system 120 (also interchangeably referred to as a motion estimator) for motion information estimation of 3D-point clouds, according to an embodiment of the present disclosure. The motion estimation system 120 is configured to receive as input, a temporal sequence of 3D point clouds 110 associated with an environment of the motion estimation system 120. The environment includes an autonomous driving environment in one example. The temporal sequence of 3D point clouds 110 are sensed by a sensor, such as depth sensor which can sense a dynamic environment to collect the temporal sequence of 3D point clouds 110. The temporal sequence of 3D point clouds 110 includes a current 3D point cloud and a previous 3D point cloud.

The motion estimation system 120 is operatively connected to the depth sensor via one or a combination of wired and wireless communication channels. The motion estimation system 120 may be implemented as a system having a processor and a memory in some embodiments. The memory may store computer-executable instructions that are executed by the processor to carry out the functionalities of the motion estimation system 120. For example, the motion estimation system is configured to process iteratively the temporal sequence of 3D point clouds with a neural network. The detailed structure of such a neural network would be discussed in detail in FIG. 2.

The processing of the temporal sequence of 3D point clouds 110 by the neural network of the motion estimation system 120 leads to generation of a multi-head motion estimation output. To that end, the neural network included in the motion estimation system 120 is a multi-head neural network that produces different outputs 130 as different heads of the neural network. The different outputs 130 may be such as a motion information head 1 130a and a motion information head 2 130b. The motion estimation system 120 of FIG. 1 shows two outputs as an example illustration only. In practice, any number of heads at the output of the motion estimation system 120 are possible, without deviating from the scope of the present disclosure.

In one embodiment, the multi-head motion estimation output 130 comprises a motion vector head, and a motion state head. To that end, the neural network included in the motion estimation system 120 is a multi-head network processing the sequence of 3D point clouds 110 to generate a predicted motion vector and an estimated motion state for every single 3D point in a current point cloud.

In one embodiment, the multi-head motion estimation output 130 comprises a segmentation head and a motion state head. To that end, the neural network included in the motion estimation system 120 is a multi-head network processing the sequence of 3D point clouds 110 to generate semantic labels and an estimated motion state for every single 3D point in the current point cloud. For this, the neural network may further include a segmentation neural network trained to extract semantic features from each 3D point cloud in the input sequence of 3D point clouds 110. The neural network further includes a segmentation head trained to estimate the semantic labels for every single 3D point in the current point cloud. The neural network further includes a point-motion neural network trained to extract motion features based on the semantic features across time stamps, and a motion state head trained to estimate the motion states.

The detailed structure of the neural network included in the motion estimation system 120 will be discussed in conjunction with FIG. 2, FIG. 3, FIG. 4, and FIG. 5 described below.

Figure 2:
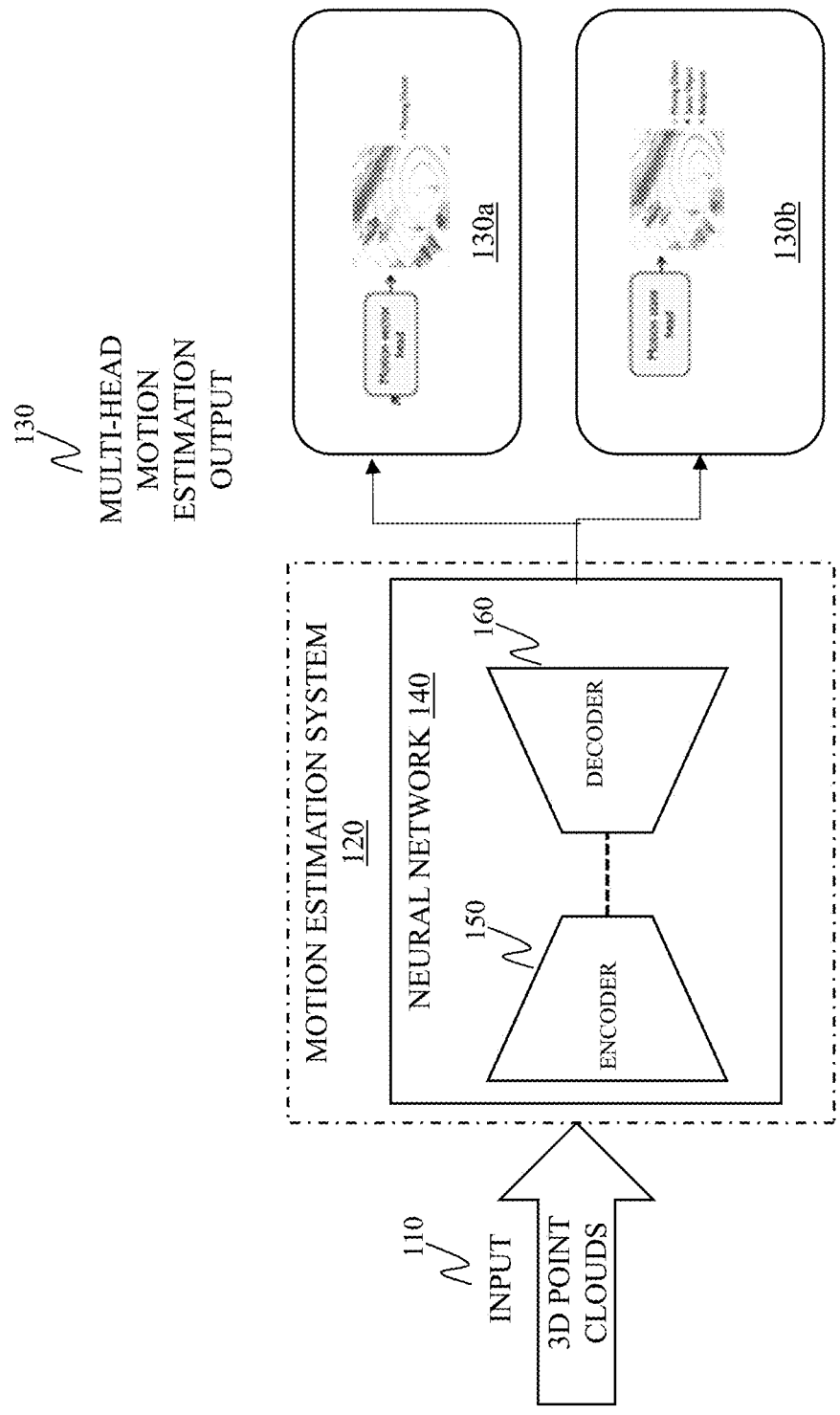
FIG. 2 shows a block diagram of the motion estimation system of FIG. 1 including a neural network, according to an embodiment of the present disclosure.

FIG. 2 shows a block diagram of an internal structure of a neural network 140 included in the motion estimation system 120, according to an embodiment of the present disclosure.

The neural network 140 includes an encoder 150 for providing a spatiotemporal encoding of each point in each of the 3D point clouds 110. To that end, to encode a current point of the current 3D point cloud, the encoder 150 is configured to extract features of neighboring points in the current 3D point cloud located in proximity to a location of the current point to produce a current spatial encoding of the current point in the current frame. Further, the encoder 150 is configured to extract features of neighboring points in a previous 3D point cloud located in proximity to a location in the previous 3D point cloud corresponding to the location of the current point, to produce a previous spatial encoding of the current point in the previous frame. Further, the encoder 150 is configured to combine the current spatial encoding and the previous spatial encoding to produce a spatiotemporal encoding of the current point.

The neural network 140 further includes a decoder 160 for decoding the spatiotemporal encodings produced by the encoder 150 to generate motion information for each point of each of the 3D point clouds 110. To that end, the neural network 140 is a multi-head (neural) network 140 processing the sequence of 3D point clouds 110 to generate a predicted motion vector in the form of a motion vector head 130a, and an estimated motion state in the form of a motion state head 130b, for every single 3D point in the input sequence of 3D point clouds 110.

The multi-head neural network 140 produces multiple outputs by appending multiple heads (such as head 1 130a, head 2 130b and the like) to the end of the multi-head neural network 140 depending on the desired functionality. For example, for motion classification the two heads include the motion vector head 130a, which predicts the motion vector for each 3D point in the current frame; and the motion state head 130b which estimates the binary motion state for each 3D point in the current frame. To that end, the motion vector head 130a is implemented by three fully connected layers and the motion state head 130a is implemented by one fully connected layer followed by a leaky Rectified Linear Unit (ReLU) in one example embodiment.

In an embodiment, the neural network 140 uses a smooth L1 loss $L_{vector}$ to supervise motion vector prediction at the motion vector head 130a, and a cross entropy loss $L_{state}$ for motion state head 130b. The motion state head 130b for motion state estimation and the motion vector head 130b for motion vector prediction are trained jointly with the overall loss $L=L_{vector}+0.1L_{state}$. In an example embodiment, in the testing phase, the estimated binary motion states are used to refine the predicted motion vectors: when the estimated motion state is static, the corresponding motion vector is set to zero.

Figure 3:
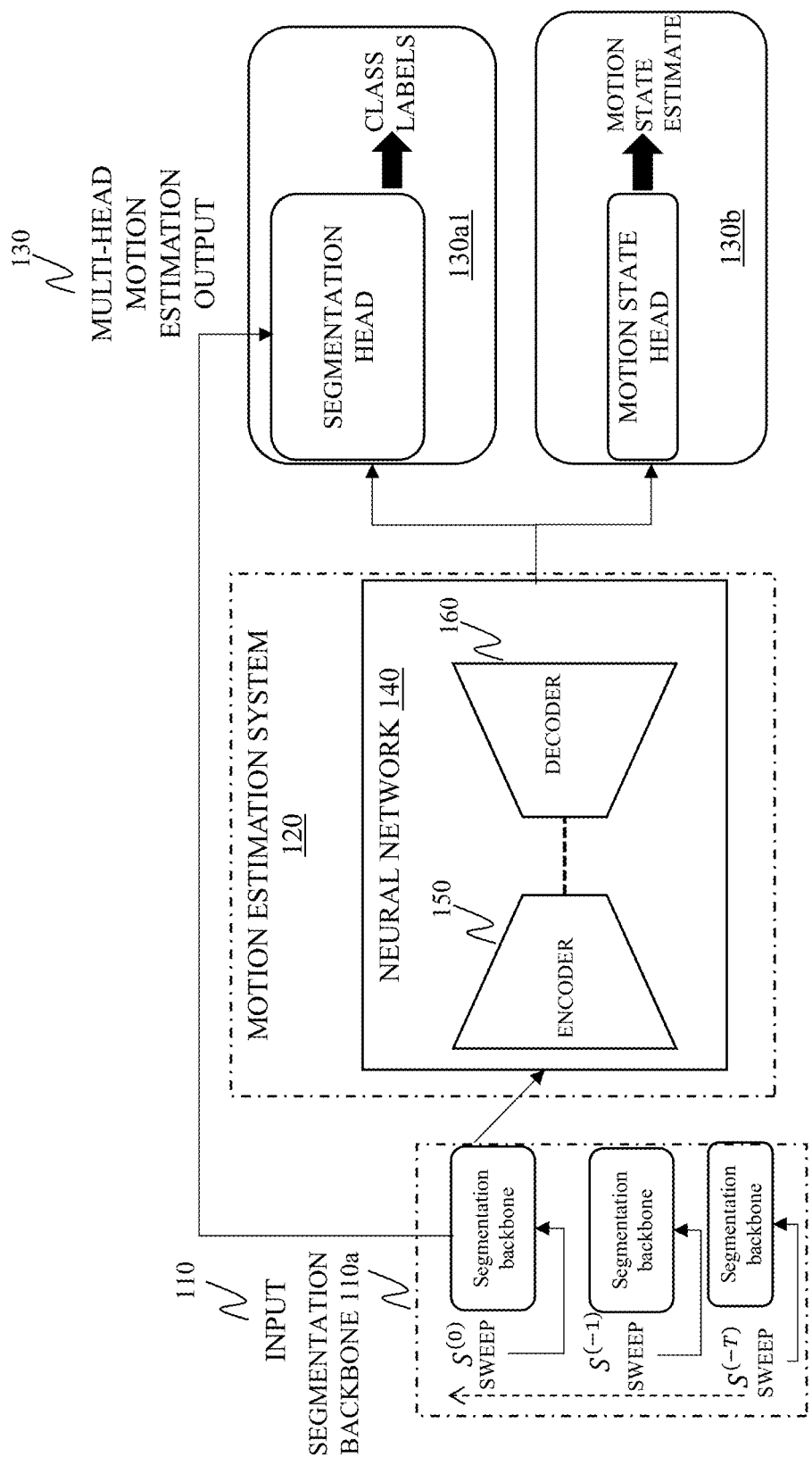
FIG. 3 shows a block diagram of an example working use case of the neural network of FIG. 2, according to an embodiment of the present disclosure.

In another example, the multi-head neural network generates different outputs, which are shown in FIG. 3.

FIG. 3 shows another block diagram of the neural network 140 of FIG. 2 for generating multi-head outputs 130, according to an embodiment of the present disclosure.

The neural network 140 is a multi-head network processing the sequence of 3D point clouds 110 to generate semantic labels or class labels at a segmentation head 130a1, and an estimated motion state as the motion state head 130b for every single 3D point in the current point cloud.

In some embodiments, the neural network 140 includes a segmentation neural network trained to extract semantic features from each 3D point cloud, the segmentation head 130a1 trained to estimate the semantic labels, a point-motion neural network trained to extract motion features based on the semantic features across time stamps, and the motion state head 130b trained to estimate the motion states.

In order to generate the semantic labels at the segmentation head 130a1, a multisweep semantic segmentation is performed by the multi-head neural network 140 on given the sequence of 3D point clouds 110.

In an embodiment, the multi-head neural network 140 is configured to take multiple sweeps as the input 110 and directly estimate all the semantic and motion labels at the output 130.

The semantic labels include, for example, a car, a road, a building, a sidewalk, a vegetation, and the like. However, in many implementations of the neural network 140, such as for motion estimation in dynamic environments, foreground categories or semantic labels, such as vehicles, pedestrians, and cyclists, include semantic information and motion information that are mostly independent. Therefore jointly training the neural network 140 for generating the semantic and motion information is not advantageous. Moreover, the 3D point clouds in a previous sweep might not significantly benefit the point-wise semantic labeling of the current sweep, because the points across sweeps do not have a clear point-to-point correspondence. Therefore, in an embodiment, the multisweep semantic segmentation performed by the neural network 140 is split into two separated tasks: semantic segmentation based on a single sweep, and motion state estimation based on multiple sweeps.

The operation of the neural network 140 as a multisweep semantic segmentation system is performed using the architecture shown in FIG. 3. The overall architecture consists of four parts: a segmentation backbone 110a, the segmentation head 130a1, the neural network 140 and the motion state head 130b. The segmentation backbone 110a consumes each individual sweep and learns per-point semantic features. All sweeps share the same backbone network. For example, let $\mathcal{P}=\{S^{(t)}\}_{t=0}^{-T}$ be a temporal sequence of 3D point clouds, where the set $\{S^{(t)}\}=\{p_i(t)\}_{i=1}^{N_t}$ is the point cloud collected at the tth frame with $p_i^{(t)}$ the ith point in the tth frame. Here t=0 denotes the current frame and t<0 denotes previous frames. Let $p_i^{(t)} \in \mathbb{R}^3$ be the 3D coordinate of the point $p_i^{(t)}$. Since $p_i^{(t)}$ is also indexed by time, together with 3D coordinates, it is considered a 4D point and $\mathcal{P}$ a 4D point cloud. The neural network 140 is configured to produce motion information for each point in a current frame (of LIDAR sweep), that is, $m_i^{(0)}=f(p_i^{(0)}, \mathcal{P})$ where $m_i^{(0)}$ i could be a scalar to indicate the moving probability, or a 3D vector to indicate the motion displacement. Thus, the different sweeps corresponding to point clouds at different frames at different time instances, for example a sweep $S^{(0)}$ at time t=0, a sweep $S^{(-1)}$ at a previous frame at time instant −1, and a sweep $S^{(-T)}$ at a previous frame at time instant −T are all provided to the segmentation backbone 110a at their respective instances of time, and the sweep $S^{(0)}$ is also provided to the segmentation head 130a1, to predict corresponding class labels in each sweep.

The segmentation head 130a1 takes semantic features of all the points in the current sweep to generate the per-point semantic labels. It is implemented by a fully connected layer followed by a softmax layer. The third component, the neural network 140, learns motion features based on semantic features from the segmentation backbones across all sweeps. The motion state head takes 130b the motion features to estimate the motion state for each point in the current sweep. It is implemented by a fully connected layer followed by a sigmoid layer.

In an embodiment, cross-entropy losses are adopted for both multi-category semantic segmentation performed by the segmentation head 130a1, and the binary motion state estimation performed by the motion state head 130b. Further, based on the ground truth of the semantic category, a foreground mask is applied to the motion state estimation head 130b, so that only the losses of foreground points are counted. The overall loss function combines the semantic segmentation loss and the motion state loss. In an example, in the training phase, a pretrained segmentation backbone is used to focus on motion training and accelerate the training time. In the inference phase, for estimated background categories, the neural network 140 then sets the corresponding estimated motion states to be static.

At the core of the multisweep semantic segmentation system is the underlying neural network 140, which will be discussed next in conjunction with FIG. 4.

Figure 4:
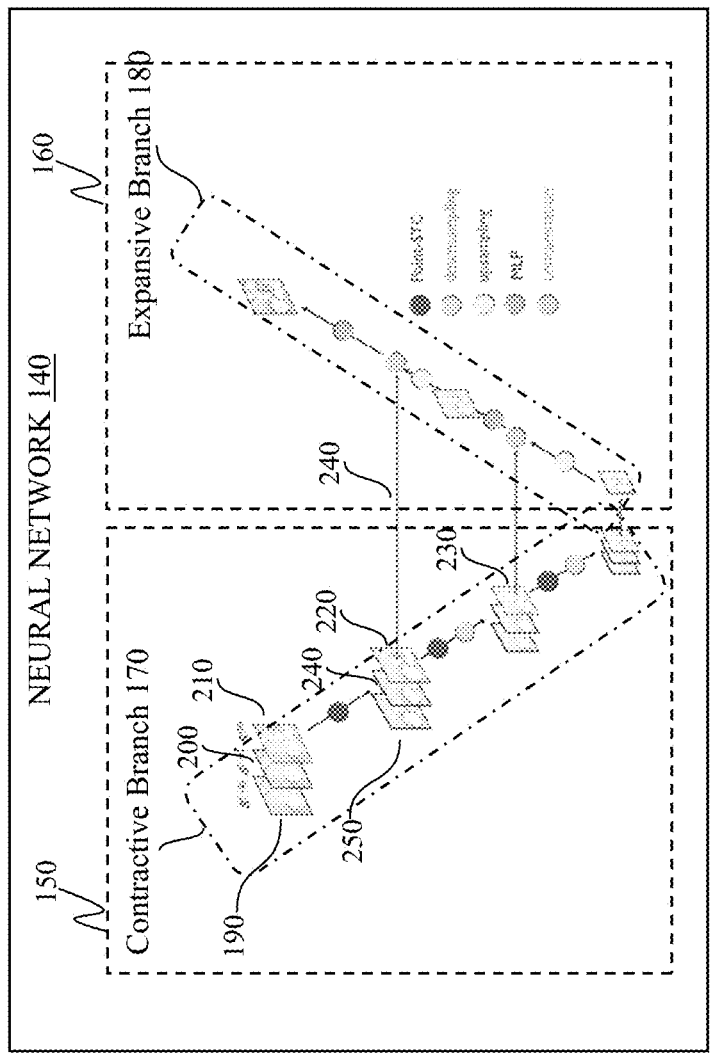
FIG. 4 shows another block diagram of an internal structure of the neural network of FIG. 2, according to an embodiment of the present disclosure.

FIG. 4 shows a detailed internal structure of the neural network 140 of FIG. 2 showing a contractive branch 170 and an expansive branch 180, according to an embodiment of the present disclosure.

Some embodiments are based on the realization that a location-based extraction of features from 3D point clouds, followed by subsequent perceptron combination, results in a spatiotemporal convolution (STC) of the 3D point clouds, which is advantageous for motion information extraction. However, the effect of the spatiotemporal convolution can be further increased by extending the abovementioned principles into a deep structure of the neural network 140 as shown in FIG. 4.

To that end, in some embodiments, the neural network 140 includes a pyramid and/or a U-shape architecture formed by the contractive branch 170 that sequentially downsamples its input, and the expansive branch 180 that sequentially upsamples its input. The contractive branch 170 includes one or multiple pairs of encoders as encoder layers and the expansive branch 180 includes multiple corresponding decoder layers to enable spatiotemporal feature learning. In addition, the contractive branch 170 includes one or multiple downsampling layers and the expansive branch 180 includes one or multiple pairs of decoders and corresponding upsampling layers that enable multi-scale feature learning. Some embodiments also include skip connections that enable the aggregation layers to fuse features from both the encoder 150 and the decoder 160.

Some embodiments are based on a recognition that an encoder produces encodings of the current point cloud. When the encoder is executed for the first time, a current point could 210 is encoded into encodings 220 based on other previous point clouds 200 and 190. However, to further encode the encodings 220 into the secondary encodings 230, there is a need to have encodings 240 and 250 corresponding to the encodings 220.

Accordingly, one embodiment uses encodings 240 and 250 determined by the previous iterations when the point clouds 200 or 190 were current frames. This embodiment is computationally efficient but needs to store all encodings 210, 200, and 190 in memory for subsequent processing.

Thus, the contractive branch 170 has multiple encoders including a first encoder corresponding to encodings 210 and a second encoder corresponding to encodings 220 arranged to process downsampled outputs of the first encoder indicative of current encodings of the spatiotemporal features of the current point cloud, wherein the second encoder process the current encodings together with corresponding encodings of the previous point clouds determined during the previous iteration.

To that end, the neural network 140 accepts a sequence of 3D point clouds, where each original point cloud frame is described by its local coordinate system. Further, all the past frames are synchronized to the current one, i.e., represent all the point clouds within the current coordinate system of ego vehicle via coordinate transformation. This is critical for counteracting the ego-motion of AV and avoiding specious motion estimation. In addition, it aggregates more points for the static background while providing clues on the motions of moving objects.

The neural network 140 further classifies each point in a point cloud at the current time and estimate its future position. The spatio-temporal pyramid network shown in FIG. 4 extracts features along both the spatial and temporal dimensions in a hierarchical fashion. The left part acts like the encoder 150 that extracts spatiotemporal features at multiple scales; and the right part acts like the decoder 160 that only focuses on aggregating features at the current frame from both the previous layer and the encoder.

The basic building block of the neural network 140 is a point spatio-temporal convolution (p-STC) block. As the main component to extract spatiotemporal features from points, a Point-STC layer implements a 4D point spatiotemporal convolution. The first layer takes raw points from multiple frames as the input, where the point features are their 3D coordinates. For the deeper layers, the point features are hidden features from the previous layer. For each point, the spatiotemporal neighborhood is implemented by collecting all the 3D points within a pre-defined spatial distance to this query point at each time stamp. This will be explained with the help of an example mathematical formulation as below:

Let us consider that to extract motion features for 4D points, a spatiotemporal convolution operation is used. Let $x_i^{(t)}$ be the input features of the point $p_i^{(t)}$. For $p_i^{(t)}$, the 4D point spatiotemporal convolution (Point-STC) operates as, $$y_i^{(t+\tau)} = \sum_{p_j^{(t+\tau)} \in S^{(t+\tau)} \cup N(p_i^{(t)})} \Psi_{p_i^{(t)}, p_j^{(t+\tau)}}(x_j^{(t+\tau)})$$

$$z_i^{(t)} = MLP\left(concat\left(\{y_i^{(t+\tau)}\}\right)_{\tau=0}^{-T}\right)$$

where MLP(•) denotes the multilayer perceptron network shared by all the points and concat(•) denotes the concatenation operation that combines several short vectors to output a long vector, a kernel function $$\Psi_{p_i^{(t)}, p_j^{(t+\tau)}}(x_j^{(t+\tau)})$$

that evaluates the effect from point $p_j^{(t+\tau)}$ to point $p_i^{(t)}$ and N $(p)=\{q \in R^3 \| \|q-p\|_2 \leq r\}$ defines a neighboring set of points for point p with $r \in R$ a pre-defined radius, reflecting a fixed 3D-ball space. Step (1a) is a spatial convolution that aggregates the neighboring information at each single frame and $y_i^{(t+\tau)}$ denotes the intermediate feature extracted at frame t+τ; and step (1b) aggregates temporal features sequentially based on time stamps and $z_i^{(t)}$ denotes the output feature for $p_i^{(t)}$. Since the sequence length T is usually small in practice, MLP works effectively. Combining (1a) and (1b), information aggregation over both the spatial and temporal dimensions is obtained. This will be further discussed in FIG. 5.

To that end, using the neural network 140 to perform the Point-STC as described above, instead of looking for point-to-point correspondences, correspondences across time are leveraged in the time-invariant neighboring space. Because for each point, this neighboring space is fixed given a radius, the spatial features within this space are evaluated across time to extract motion features.

To that end, to define the kernel function $$\Psi_{p_i^{(t)}, p_j^{(t+\tau)}}(x_j^{(t+\tau)}),$$

instead of directly considering the pairwise effect from $p_j^{(t+\tau)}$ to point $p_i^{(t)}$, a few proxy points are introduced to represent each 4D point and then consider the effect from $p_j^{(t+\tau)}$ to each of the proxy points. The benefit is to leverage multiple kernels to make the training of the neural network 140 more stable and effective.

Further, the Point-STC computations discussed above directly handle raw 4D points without any discretization. Since the operation only takes the neighboring points, therefore entire point cloud is not needed to be handled at the same time; instead, a large-scale point cloud is split into multiple patches, which are small-scale point clouds, and each patch is handled locally. This results in significantly easing the computation and makes it easier to handle large-scale 3D point clouds in computing systems.

In an embodiment, to ease the computational cost, downsampling of 3D point clouds is done. To that end, in a largescale scene, a point cloud is usually irregularly sampled, where nearby points are relatively denser and far-away points are relatively sparser. Uniformly downsampling would make far-away points too sparse. To resolve this issue, the downsampling in implemented based on 3D voxels. Firstly a 3D scene is partitioned into a series of nonoverlapping 3D voxels. In each non-empty voxel, one 3D point is sampled. When a voxel has multiple 3D points, their barycenter is taken as their proxy in this voxel. At each time stamp, the sampled points are collected from all the voxels to be a downsampled 3D point cloud. In this manner, more nearby points are downsampled and less points far-away are downsampled, balancing the spatial distribution of point density. The voxel size is defined as $d_{L+1}=2d_L$, where L is the network layer index. In some embodiments the downsampled 3D points are still irregularly scattered in the 3D space, which is clearly different from the regular voxelization.

The neural network 140 further includes the upsampling layer that aims to populate point features from a downsampled point cloud to an original point cloud (previous layer before the downsampling layer). For each 3D point in the original point cloud, its closest point is found in the downsampled point cloud and to take its associated point features.

The neural network 140 further includes the aggregation layer that is configured to aggregate point features from both the encoder 150 and the decoder 160 at the same scale. In the pyramid architecture of FIG. 4, a skip connection 240 is illustrated as lines connecting the left encoder 150 branch to the right decoder 160 branch, to introduce the point features at the current time stamp from the encoder side and concatenate them with the corresponding point features from the upsampled point cloud. Then a multilayer perceptron may be used to aggregate the concatenated features.

Additionally or alternatively, one embodiment permutes the order of the point clouds to change the notion of the current and previous point clouds. For example, after the encoder produces the encodings 220 by processing current point cloud 210 and the previous point cloud 200, the embodiment permutes the order of the point clouds and submits the permuted point clouds as current point cloud 200 and previous point cloud 210 to produce the encodings 240.

To that end, the encoder 150 is configured to distinguish between the current point cloud 210 and the previous point cloud 200 based on an order of point clouds in the sequence of point clouds. For this, the first encoder is executed to process the current point cloud 210 and the previous point cloud 200 to produce current encodings 220. Then the order of the current and previous point clouds is permuted. Then, the first encoder is again executed to process permutation of the current point cloud 200 and the previous point cloud 210 to produce previous encodings 240. Further, the second encoder is executed to process the current encodings 220 and the previous encodings 240.

Figure 5:
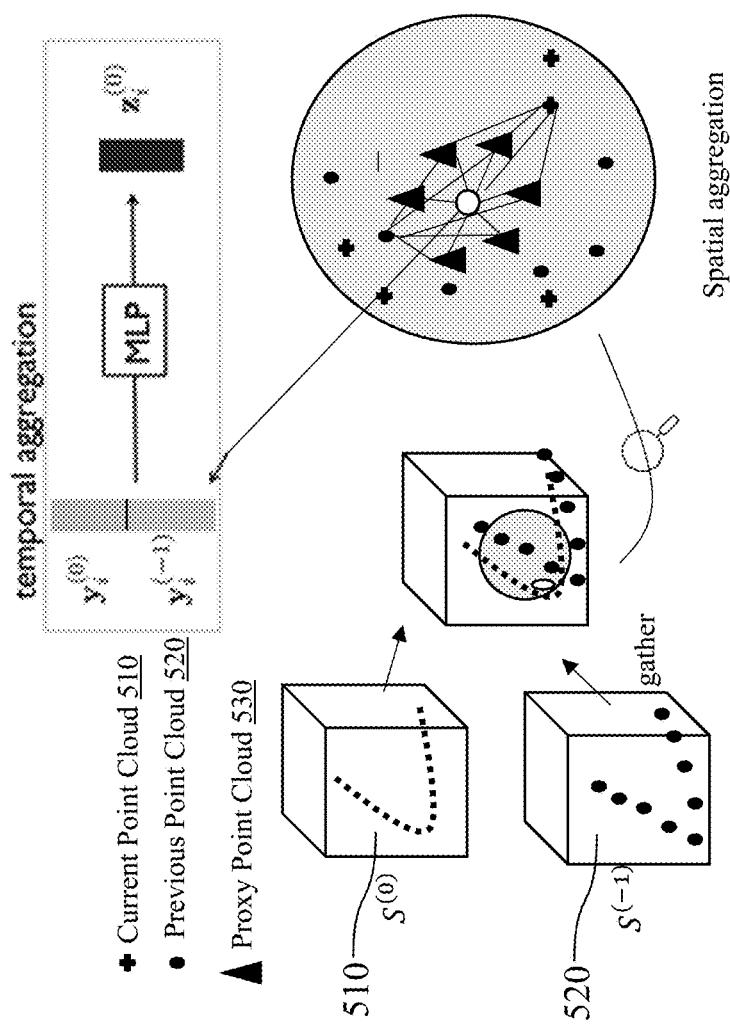
FIG. 5 shows a block diagram of an intermediate working step of the neural network of FIG. 2 based on proxy-point calculations, according to an embodiment of the present disclosure.

FIG. 5 shows a block diagram of an intermediate working step of the neural network 140 of FIG. 2 based on proxy-point calculations, according to an embodiment of the present disclosure. For each point in a current point cloud $p_i^{(t)}$ 510, called a query point, a neighborhood is defined by a sphere of radius r that enables the selection of test points from previous scans $p_i^{(t+\tau)}$ also known as points in a previous point cloud 520, where it should be understood that $\tau<0$. A point q is in the neighborhood of another point p, N(p), if $\|q-p\|_2 \leq r$. Associated with each query point are also a fixed set of K proxy points $\delta_{ik}$ which points a proxy point cloud 530 whose absolute positions are determined by the position of the query point. For each test point in the neighborhood of the query point a kernel function is evaluated for each proxy point with the form $$h(\delta_k, p_j^{(t+\tau)}) = \max\left(0, 1 - \frac{\|\delta_k - p_j^{(t+\tau)}\|_2}{\sigma}\right) \text{ where } \sigma = \frac{r}{2}$$

is a hyperparameter and max is a mathematical operator that selects whichever argument is the largest. The results of each of the kernel evaluations are combined into a multi-kernel function for each query point given by $$\Psi_{p_i^{(t)}, p_j^{(t+\tau)}}(x_j^{(t+\tau)}) = \sum_{\delta_k \in \mathcal{K}(p_i^{(t)})} w_k h(\delta_k, p_j^{(t+\tau)}) x_j^{(t+\tau)}$$

where summation is over the set of proxy point locations, the $w_k$ are the learnable weights of the function, and $x_j^{(t+\tau)}$ are information associated with each point, typically the point's spatial location. A feature vector for each test point $p_j^{(t+\tau)}$ in sweep $S^{(t+\tau)}$ that is in the neighborhood N ($p_i^{(t)}$) of query point $p_i^{(t)}$ can be computed from the multi-kernel function by $$y_i^{(t+\tau)} = \sum_{p_j^{(t+\tau)} \in S^{(t+\tau)} \cup N(p_i^{(t)})} \Psi_{p_i^{(t)}, p_j^{(t+\tau)}}(x_j^{(t+\tau)})$$

It should be noted that the present formulation of using proxy point eliminates the need for determining point-to-point correspondences between different sweeps and instead leads to finding relationship among points in a neighborhood.

According to some embodiments, the motion estimation system 120 is configured to generate proxy points wherein the neighboring points in the current and the previous 3D point clouds are confined to a sphere centered on the location of the current point in the current 3D point cloud.

Some embodiments are based on a recognition that location-to-location comparison may consider features of a different number of points at different locations to evaluate the motion information of the current point. While this comparison is better suited for 3D point clouds than for 2D images this difference may introduce instability of training the neural network 140. To address this problem some embodiments use weighted kernel functions extracting features of the neighboring points with respect to artificially introduced multiple proxy points within each neighborhood. The weights of the weighted kernel functions are determined via training the neural network 140, while the structure of the kernel function is predetermined to extract features of the neighborhood of points with respect to the current point. However, the introduction of proxy points in the kernel functions reduces the differences between extracting features in a sphere centered on an existing point, as in the current 3D point cloud, and a sphere centered on potentially empty space or a different point, as in the previous point cloud.

Further, the features of neighboring points in the current 3D point cloud and the features of neighboring points in the previous 3D point cloud are combined by processing a concatenation of the extracted features of the current and the previous 3D point clouds with a multilayer perceptron. To that end, the weighted kernel function comprises weights that are trainable parameters of the neural network 140 shared by all the points of the current point cloud.

To that end, while the point-STC performed by the neural network 140 using proxy point cloud 530 is able to gather information about current point cloud 510 $S^{(0)}$ and previous point cloud $S^{(-1)}$ to operate on multiple frames by concatenating spatial features from all frames in the form of spatial aggregation. Further, the Point-STC performed by the neural network 140 is configured to preserve the temporal ordering by sequentially concatenating spatial features from each frame and using MLP to fully extract and aggregate temporal information. For example, in FIG. 5, $y_i^0$ represents an intermediate feature extracted at current frame, and $y_i^{-1}$ represents an intermediate feature extracted at a previous frame.

In this manner, the motion estimation system 120 based on the neural network 140 described in previous embodiments, is used for multiple applications in real-time autonomous, semi-autonomous or manual driving applications, using any suitable computing device.

Figure 6:
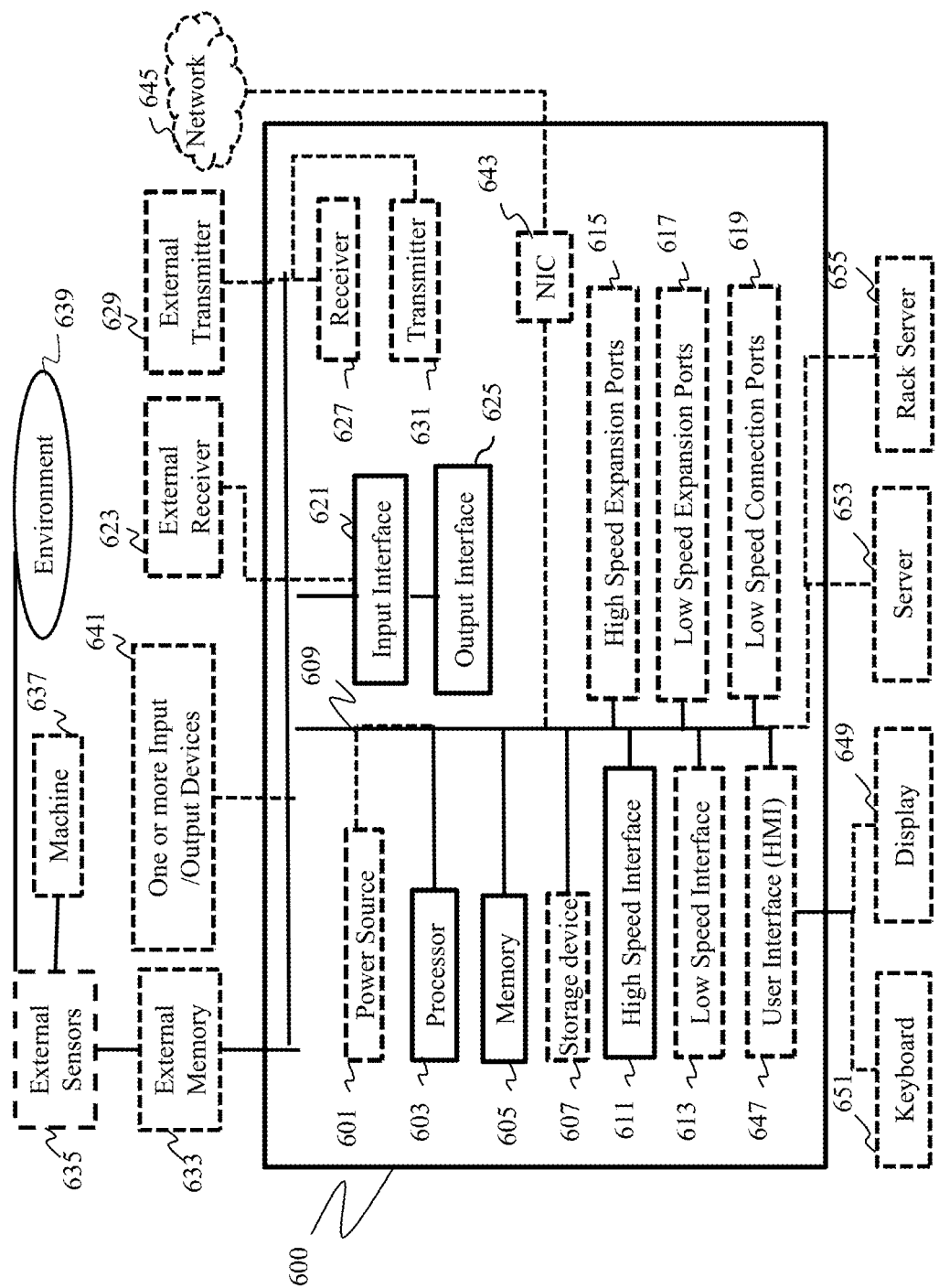
FIG. 6 is a schematic diagram illustrating a computing device that can be used for implementing systems and methods of the present disclosure.

FIG. 6 is a schematic diagram illustrating a computing device 600 that can be used for implementing systems and methods of the present disclosure.

The computing device 600 includes a power source 601, a processor 603, a memory 605, a storage device 607, all connected to a bus 609. Further, a high-speed interface 611, a low-speed interface 613, high-speed expansion ports 615 and low speed connection ports 617, can be connected to the bus 609. In addition, a low-speed expansion port 619 is in connection with the bus 609. Further, an input interface 621 can be connected via the bus 609 to an external receiver 623 and an output interface 625. A receiver 627 can be connected to an external transmitter 629 and a transmitter 631 via the bus 609. Also connected to the bus 609 can be an external memory 633, external sensors 635, machine(s) 637, and an environment 639. Further, one or more external input/output devices 641 can be connected to the bus 609. A network interface controller (NIC) 643 can be adapted to connect through the bus 609 to a network 645, wherein data or other data, among other things, can be rendered on a third-party display device, third party imaging device, and/or third-party printing device outside of the computing device 600.

The memory 605 can store instructions that are executable by the computing device 600 and any data that can be utilized by the methods and systems of the present disclosure. The memory 605 can include random access memory (RAM), read only memory (ROM), flash memory, or any other suitable memory systems. The memory 605 can be a volatile memory unit or units, and/or a non-volatile memory unit or units. The memory 605 may also be another form of computer-readable medium, such as a magnetic or optical disk.

The storage device 607 can be adapted to store supplementary data and/or software modules used by the computer device 600. The storage device 607 can include a hard drive, an optical drive, a thumb-drive, an array of drives, or any combinations thereof. Further, the storage device 607 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 603), perform one or more methods, such as those described above.

The computing device 600 can be linked through the bus 609, optionally, to a display interface or user Interface (HMI) 647 adapted to connect the computing device 600 to a display device 649 and a keyboard 651, wherein the display device 649 can include a computer monitor, camera, television, projector, or mobile device, among others. In some implementations, the computer device 600 may include a printer interface to connect to a printing device, wherein the printing device can include a liquid inkjet printer, solid ink printer, large-scale commercial printer, thermal printer, UV printer, or dye-sublimation printer, among others.

The high-speed interface 611 manages bandwidth-intensive operations for the computing device 600, while the low-speed interface 613 manages lower bandwidth-intensive operations. Such allocation of functions is an example only. In some implementations, the high-speed interface 611 can be coupled to the memory 605, the user interface (HMI) 647, and to the keyboard 651 and the display 649 (e.g., through a graphics processor or accelerator), and to the high-speed expansion ports 615, which may accept various expansion cards via the bus 609. In an implementation, the low-speed interface 613 is coupled to the storage device 607 and the low-speed expansion ports 617, via the bus 609. The low-speed expansion ports 617, which may include various communication ports (e.g., USB, Bluetooth, Ethernet, wireless Ethernet) may be coupled to the one or more input/output devices 641. The computing device 600 may be connected to a server 653 and a rack server 655. The computing device 600 may be implemented in several different forms. For example, the computing device 600 may be implemented as part of the rack server 655.

Figure 7:
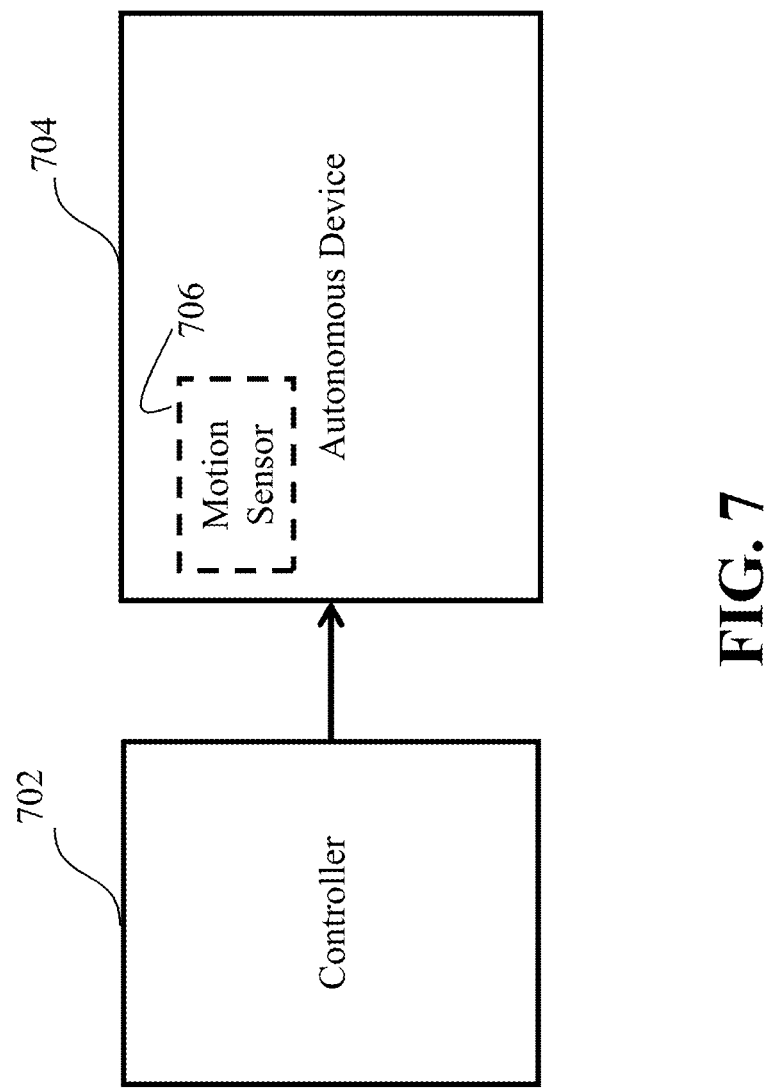
FIG. 7 is a schematic diagram illustrating a use case for implementing systems and methods of the present disclosure.

FIG. 7 is a schematic diagram illustrating a use case for implementing systems and methods of the present disclosure. The use case shows a controller 702 configured to control an autonomous device 704 moving in the dynamic environment based on the motion information of at least some points determined by the motion sensor 706 of FIG. 1.

The autonomous device 704 may be an autonomous or semi-autonomous controlled vehicle for which the control inputs are generated by using some embodiments. The controlled vehicle may be equipped with the motion estimation system 120 as part of the motion sensor 706. In some embodiments, the motion state of the autonomous device is estimated using the motion sensor 706 and subsequently, control inputs are generated specifying values of one or combination of a steering angle of the wheels of a vehicle and a rotational velocity of the wheels, and one or combination of a rotation rate of the vehicle and an acceleration of the vehicle.

The generated control inputs aim to keep the autonomous device 704 within particular bounds of a road and navigate safely.

Figure 8:
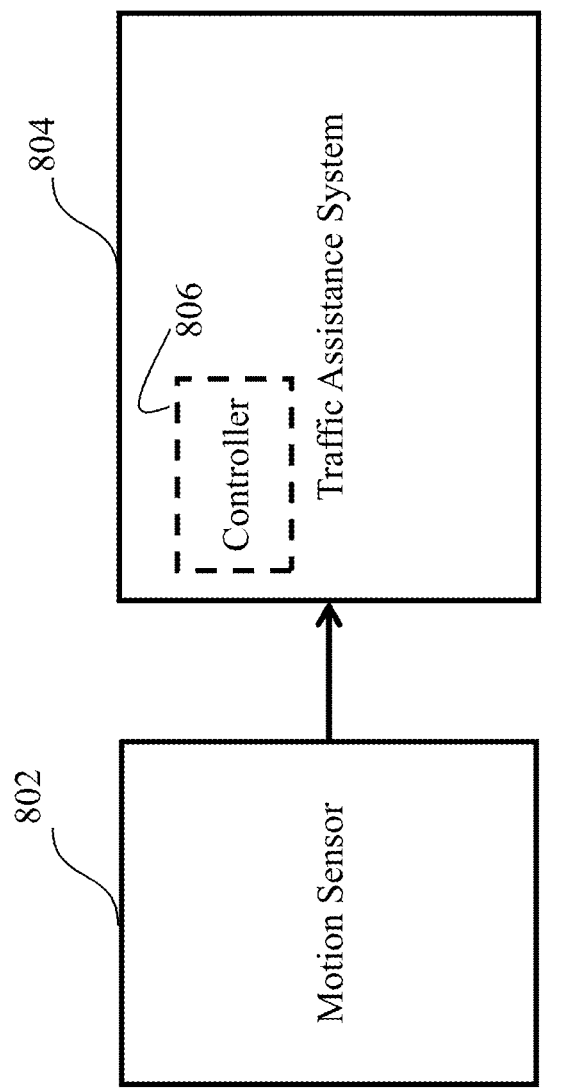
FIG. 8 is a schematic diagram illustrating another use case for implementing systems and methods of the present disclosure.

FIG. 8 is a schematic diagram illustrating another use case for implementing systems and methods of the present disclosure. The use case shows a traffic assistance system 804 operatively connected to the motion sensor 802 of FIG. 1. The traffic assistance system 804 includes a controller 806 configured to perform a control action based on the motion information of at least some points, the control action includes one or a combination of a traffic estimation, an anomaly detection, generation of crosswalk warnings, and scheduling a traffic light.

Figure 9:
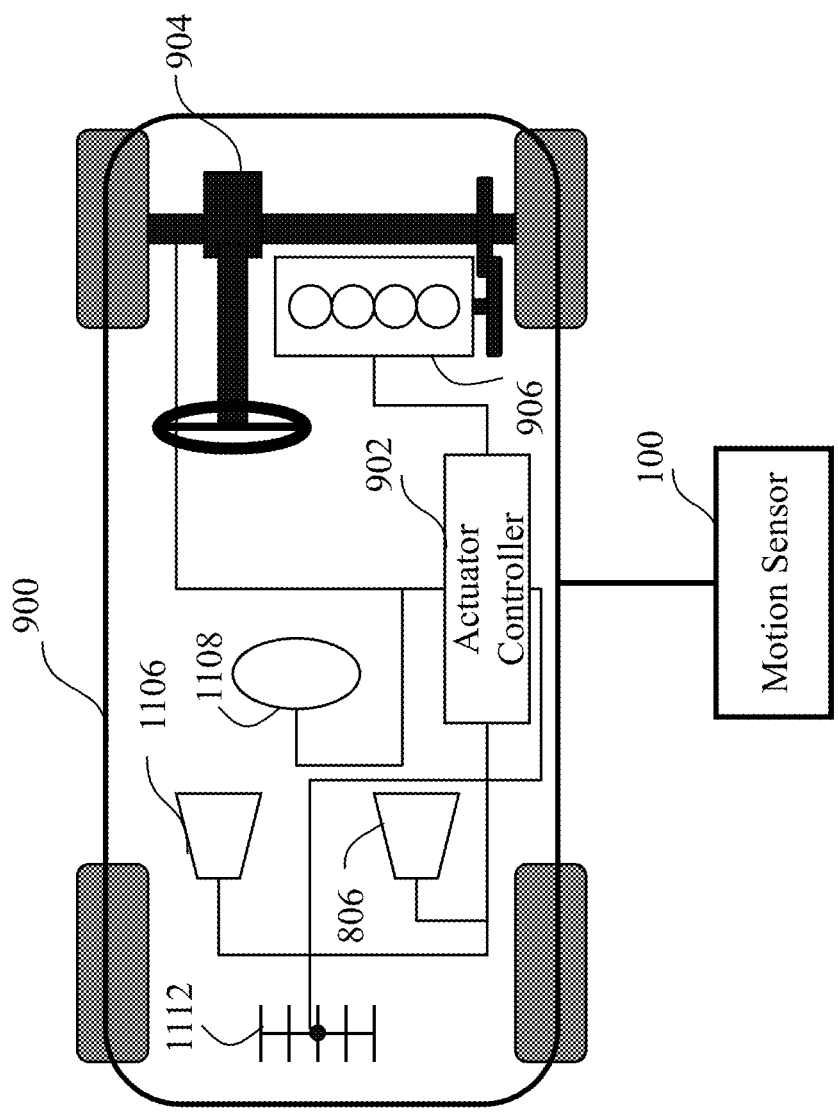
FIG. 9 is a schematic diagram illustrating yet another use case for implementing systems and methods of the present disclosure.

FIG. 9 is a schematic diagram illustrating yet another use case for implementing systems and methods of the present disclosure. The use case shows an autonomous device 900 moving in a dynamic environment. The autonomous device 900 comprises the motion sensor 100 of FIG. 1, and an actuator controller 902 (also referred to hereinafter as actuator) configured to control the autonomous device 900 based on the motion information of at least some points.

The actuator 902 may control a steering controller 904 and a brake/throttle controllers 906 that control rotation and acceleration of the autonomous device 900. In such a case, the actuator 902 outputs control commands, based on the control inputs, to the controllers 904 and 906 to control the kinematic state of the autonomous device 900, which may be a vehicle. In some embodiments, the controllers also includes high-level controllers, e.g. a lane-keeping assist controller that further process the control commands of the actuator 902. In both cases, the controllers utilize the output of the actuator controller 902 i.e. control commands to control at least one actuator of the vehicle 900, such as the steering wheel and/or the brakes of the vehicle 900, in order to control the motion of the vehicle 900 in accordance with methods and systems performed by the motion sensor 100.

Figure 10:
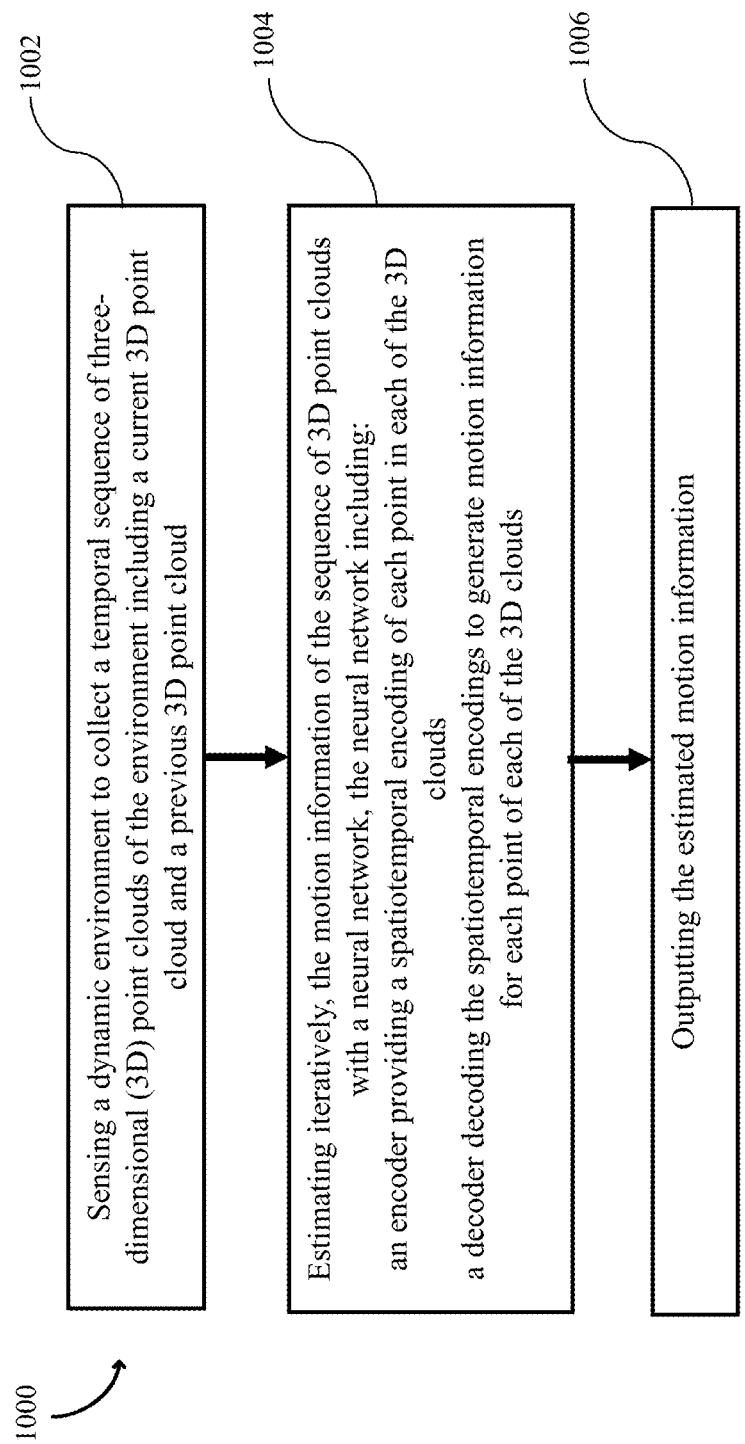
FIG. 10 is a block diagram of a method for motion information estimation, according to an embodiment of the present disclosure.

FIG. 10 illustrates a method 1000 performed by the motion sensor 100 for estimating motion states of an object, according to an embodiment of the present disclosure.

The method 1000 is used for estimating motion information of at least some points of a dynamic environment. At step 1002, the method 1000 comprises sensing a dynamic environment to collect a temporal sequence of three-dimensional (3D) point clouds of the environment including a current 3D point cloud and a previous 3D point cloud. The sensing may be done using depth sensors to sense the inputs 110 of temporal sequence of 3D point clouds, by the motion estimation system 120 shown in FIG. 1.

Then, at step 1004 the method 1000 includes estimating iteratively, the motion information of the sequence of 3D point clouds with a neural network such as the neural network 140. The neural network 140 has been described in detail in previous embodiments and includes an encoder, such as the encoder 150, providing a spatiotemporal encoding of each point in each of the 3D clouds; and a decoder, such as the decoder 160, decoding the spatiotemporal encodings to generate motion information for each point of each of the 3D point clouds in the input 110. Further, to encode a current point of the current 3D point cloud, the encoder 150 is configured to extract features of neighboring points in the current 3D point cloud located in proximity to a location of the current point to produce a current spatial encoding of the current point in the current frame. Further, the encoder 150 is configured to extract features of neighboring points in the previous 3D point cloud located in proximity to a location in the previous 3D point cloud corresponding to the location of the current point to produce a previous spatial encoding of the current point in the previous frame. Additionally, the encoder 150 is configured to combine the current spatial encoding and the previous spatial encoding to produce a spatiotemporal encoding of the current point. The neural network 140 also includes the decoder 160 to decode the spatiotemporal encodings to generate motion information for each point of each of the 3D clouds.

The method 1000 then includes, at step 1006, outputting the estimated motion information. For example, the outputting may be done by generating a control signal for a controller associated with the motion estimation system to control an object in the dynamic environment. FIG. 7, FIG. 8, and FIG. 9 illustrate such objects and their associated controllers using the motion sensor 100 implementing the method 1000.

Figure 11:
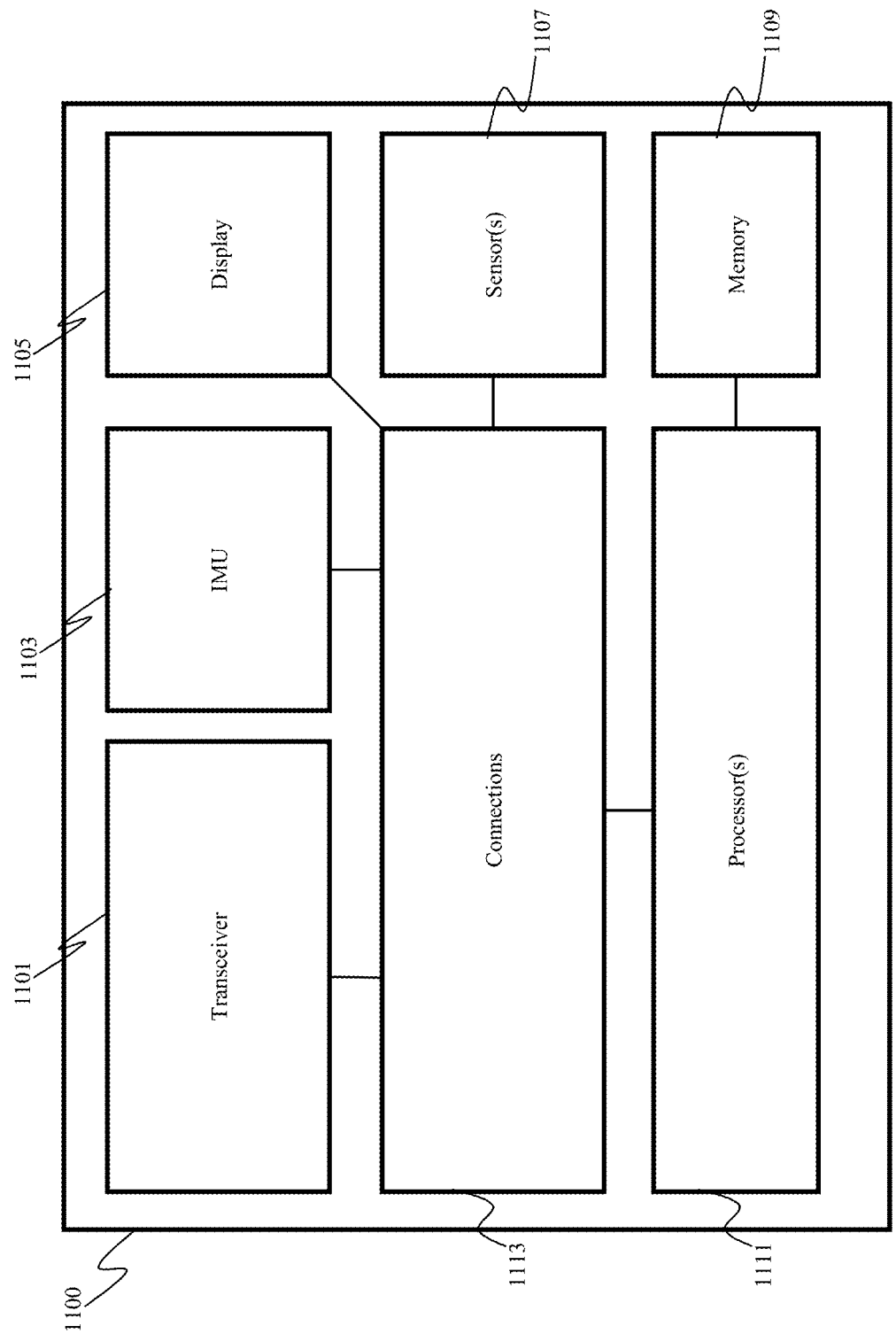
FIG. 11 is a schematic diagram illustrating a system that can be used for implementing systems and methods of the present disclosure.

FIG. 11 is a schematic diagram illustrating a system 1100 that can be used for implementing systems and methods of the present disclosure. The system 1100 includes one or combination of a transceiver 1101, an inertial measurement unit (IMU) 1103, a display 1105, a sensor(s) 1107, a memory 1109, and a processor 1111, operatively coupled to each other through connections 1113. The connections 1113 can comprise buses, lines, fibers, links, or combination thereof.

The transceiver 1101 can, for example, include a transmitter enabled to transmit one or more signals over one or more types of wireless communication networks and a receiver to receive one or more signals transmitted over the one or more types of wireless communication networks. The transceiver 1101 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 1100 can also include one or more ports for communicating over wired networks.

In some embodiments, the system 1100 can comprise depth sensors or image sensors such as CCD or CMOS sensors, lasers and/or camera, which are hereinafter referred to as "sensor 1107". For example, the sensor 1107 can convert an optical image into an electronic or digital image and can send acquired images to processor 1111. Additionally, or alternatively, the sensor 1107 can sense the light reflected from a target object in a scene and submit the intensities of the captured light to the processor 1111.

For example, the sensor 1107 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue, and Green information.

For example, the sensor 1107 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1107. For example, in some embodiments, the sensor 1107 includes RGBD cameras, which may capture per-pixel depth (D) information when the depth sensor is enabled, in addition to color (RGB) images.

As another example, in some embodiments, the sensor 1107 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 1107. Depth information can be obtained by measuring the time that the light pulses take to travel to the objects and back to the sensor.

As a further example, the depth sensor can take the form of a light source coupled to the sensor 1107. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1107 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1100 can be operatively connected to multiple sensors 1107, such as dual front cameras and/or a front and rear-facing cameras, which may also incorporate various sensors. In some embodiments, the sensors 1107 can capture both still and video images. In some embodiments, the sensor 1107 can include RGBD or stereoscopic video cameras capable of capturing images at, e.g., 30 frames per second (fps). In one embodiment, images captured by the sensor 1107 can be in a raw uncompressed format and can be compressed prior to being processed and/or stored in memory 1109. In some embodiments, image compression can be performed by the processor 1111 using lossless or lossy compression techniques.

In some embodiments, the processor 1111 can also receive input from IMU 1103. In other embodiments, the IMU 1103 can comprise 3-axis accelerometer(s), 3-axis gyroscope(s), and/or magnetometer(s). The IMU 1103 can provide velocity, orientation, and/or other position related information to the processor 1111. In some embodiments, the IMU 1103 can output measured information in synchronization with the capture of each image frame by the sensor 1107. In some embodiments, the output of the IMU 1103 is used in part by the processor 1111 to fuse the sensor measurements and/or to further process the fused measurements.

The system 1100 can also include a screen or display 1105 rendering images, such as color and/or depth images. In some embodiments, the display 1105 can be used to display live images captured by the sensor 1107, fused images, augmented reality (AR) images, graphical user interfaces (GUIs), and other program outputs. In some embodiments, the display 1105 can include and/or be housed with a touchscreen to permit users to input data via some combination of virtual keyboards, icons, menus, or other GUIs, user gestures and/or input devices such as styli and other writing implements. In some embodiments, the display 1105 can be implemented using a liquid crystal display (LCD) display or a light emitting diode (LED) display, such as an organic LED (OLED) display. In other embodiments, the display 1105 can be a wearable display. In some embodiments, the result of the fusion can be rendered on the display 1105 or submitted to different applications that can be internal or external to the system 1100.

Exemplary system 1100 can also be modified in various ways in a manner consistent with the disclosure, such as, by adding, combining, or omitting one or more of the functional blocks shown. For example, in some configurations, the system 1100 does not include the IMU 1103 or the transceiver 1101. Further, in certain example implementations, the system 1100 include a variety of other sensors (not shown) such as an ambient light sensor, microphones, acoustic sensors, ultrasonic sensors, laser range finders, etc. In some embodiments, portions of the system 1100 take the form of one or more chipsets, and/or the like.

The processor 1111 can be implemented using a combination of hardware, firmware, and software. The processor 1111 can represent one or more circuits configurable to perform at least a portion of a computing procedure or process related to sensor fusion and/or methods for further processing the fused measurements. The processor 1111 retrieves instructions and/or data from the memory 1109. The processor 1111 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1109 can be implemented within the processor 1111 and/or external to the processor 1111. As used herein the term "memory" refers to any type of long term, short term, volatile, nonvolatile, or other memory and is not to be limited to any particular type of memory or number of memories, or type of physical media upon which memory is stored. In some embodiments, the memory 1109 holds program codes that facilitate the automated parking.

For example, the memory 1109 can store the measurements of the sensors, such as still images, depth information, video frames, program results, as well as data provided by the IMU 1103 and other sensors. The memory 1109 can store a memory storing a geometry of the vehicle, a map of the parking space, a kinematic model of the autonomous ego-vehicle, and a dynamic model of the autonomous ego-vehicle. In general, the memory 1109 can represent any data storage mechanism. The memory 1109 can include, for example, a primary memory and/or a secondary memory. The primary memory can include, for example, a random-access memory, read only memory, etc.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1109 and/or the processor 1111.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments.

However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A point-cloud motion sensor for estimating motion information of at least some points of an environment, the point-cloud motion sensor comprising:
   a depth sensor configured to sense a dynamic environment to collect a temporal sequence of three-dimensional (3D) point clouds of the environment including a current 3D point cloud and a previous 3D point cloud;
   a memory configured to store computer executable instruction; and
   a processor configured to iteratively process the sequence of 3D point clouds with the neural network, the neural network including:
      an encoder providing a spatiotemporal encoding of each point in each of the 3D clouds; and
      a decoder decoding the spatiotemporal encodings to generate motion information for each point of each of the 3D clouds,
         wherein, to encode a current point of the current 3D point cloud, the encoder is configured to:
            extract features of neighboring points in the current 3D point cloud located in proximity to a location of the current point to produce a current spatial encoding of the current point in a current frame;
            extract features of neighboring points in the previous 3D point cloud located in proximity to a location in the previous 3D point cloud corresponding to the location of the current point to produce a previous spatial encoding of the current point in the previous frame; and
            combine the current spatial encoding and the previous spatial encoding to produce a spatiotemporal encoding of the current point; and
         wherein the neural network includes a contractive branch that sequentially downsamples its input and an expansive branch that sequentially upsamples its input, wherein the contractive branch includes one or multiple pairs of the encoder and a downsampling layer, and wherein the expansive branch includes one or multiple pairs of the decoder and an upsampling layer.

2. A controller configured to control an autonomous device moving in the dynamic environment based on the motion information of at least some points determined by the motion sensor of claim 1.

3. An autonomous device moving in a dynamic environment, the autonomous device comprising:
   the motion sensor of claim 1; and
   an actuator configured to control the autonomous device based on the motion information of at least some points.

4. A traffic assistance system operatively connected to the motion sensor of claim 1, the traffic system includes a controller configured to perform a control action based on the motion information of at least some points, the control action includes one or a combination of a traffic estimation, an anomaly detection, generation of crosswalk warnings, and scheduling a traffic light.

5. The motion sensor of claim 1, wherein the neighboring points in the current and the previous 3D point clouds are confined to a sphere centered on the location of the current point in the current 3D point cloud.

6. The motion sensor of claim 5, wherein the features of neighboring points in the current 3D point cloud and the features of neighboring points in the previous 3D point cloud are extracted using a weighted kernel function extracting the features with respect to multiple proxy points different from the neighboring points in the corresponding spheres of the current and the previous 3D point clouds.

7. The motion sensor of claim 5, wherein the features of neighboring points in the current 3D point cloud and the features of neighboring points in the previous 3D point cloud are combined by processing a concatenation of the extracted features of the current and the previous 3D point clouds with a multilayer perceptron.

8. The motion sensor of claim 5, wherein weights of the weighted kernel function are trainable parameters of the neural network shared by all points of the current point cloud.

9. The motion sensor of claim 1, wherein the neural network includes at least one skip connection enabling an aggregation layer to fuse features from at least one encoder of the one or multiple pairs of the encoder and the downsampling layer and at least one decoder of the one or multiple pairs of the decoder and the upsampling layer.

10. The motion sensor of claim 1, wherein the contractive branch has multiple encoders including a first encoder and a second encoder arranged to process downsampled outputs of the first encoder indicative of current encodings of the spatiotemporal features of the current point cloud, wherein the second encoder process the current encodings together with corresponding encodings of the previous point clouds determined during the previous iteration.

11. The motion sensor of claim 1, wherein the contractive branch has multiple encoders including a first encoder and a second encoder arranged to process downsampled outputs of the first encoder, wherein the processor is configured to;
 execute the first encoder to process the current point cloud and the previous point cloud to produce current encodings;
 permute the order of the current and the previous point cloud in the sequence of point clouds;
 execute the first encoder to process permutation of the current point cloud and the previous point cloud to produce previous encodings; and
 execute the second encoder to process the current encodings and the previous encodings.

12. The motion sensor of claim 1, wherein the neural network is a multi-head network processing the sequence of 3D point clouds to generate a predicted motion vector and an estimated motion state for every single 3D point in the current point cloud.

13. The motion sensor of claim 1, wherein the neural network is a multi-head network processing the sequence of 3D point clouds to generate semantic labels and an estimated motion state for every single 3D point in the current point cloud, wherein the neural network includes a segmentation neural network trained to extract semantic features from each 3D point cloud, a segmentation head trained to estimate the semantic labels, a point-motion neural network trained to extract motion features based on the semantic features across time stamps, and a motion state head trained to estimate the motion states.

14. A computer-implemented method for estimating motion information of at least some points of environment, comprising:
 sensing a dynamic environment to collect a temporal sequence of three-dimensional (3D) point clouds of the environment including a current 3D point cloud and a previous 3D point cloud;
 estimating iteratively, the motion information of the sequence of 3D point clouds with a neural network, the neural network including:
  an encoder providing a spatiotemporal encoding of each point in each of the 3D clouds; and
  a decoder decoding the spatiotemporal encodings to generate motion information for each point of each of the 3D clouds,
  wherein, to encode a current point of the current 3D point cloud, the encoder is configured to:
   extract features of neighboring points in the current 3D point cloud located in proximity to a location of the current point to produce a current spatial encoding of the current point in a current frame;
   extract features of neighboring points in the previous 3D point cloud located in proximity to a location in the previous 3D point cloud corresponding to the location of the current point to produce a previous spatial encoding of the current point in the previous frame; and
   combine the current spatial encoding and the previous spatial encoding to produce a spatiotemporal encoding of the current point; and
  wherein the neural network includes a contractive branch that sequentially downsamples its input and an expansive branch that sequentially upsamples its input, wherein the contractive branch includes one or multiple pairs of the encoder and a downsampling layer, and wherein the expansive branch includes one or multiple pairs of the decoder and an upsampling layer; and
 outputting the estimated motion information.

15. The computer-implemented method of claim 14, wherein the neighboring points in the current and the previous 3D point clouds are confined to a sphere centered on the location of the current point in the current 3D point cloud.

16. The computer-implemented method of claim 15, wherein the features of neighboring points in the current 3D point cloud and the features of neighboring points in the previous 3D point cloud are extracted using a weighted kernel function extracting the features with respect to multiple proxy points different from the neighboring points in the corresponding spheres of the current and the previous 3D point clouds.

17. The computer-implemented method of claim 15, wherein the features of neighboring points in the current 3D point cloud and the features of neighboring points in the previous 3D point cloud are combined by processing a concatenation of the extracted features of the current and the previous 3D point clouds with a multilayer perceptron.

18. The computer-implemented method of claim 15, wherein weights of the weighted kernel function are trainable parameters of the neural network shared by all the points of the current point cloud.

19. The computer-implemented method of claim 15, wherein the neural network includes at least one skip connection enabling an aggregation layer to fuse features from at least one encoder of the one or multiple pairs of the encoder and the downsampling layer and at least one decoder of the one or multiple pairs of the decoder and the upsampling layer.

20. The computer-implemented method of claim 14, wherein the contractive branch has multiple encoders including a first encoder and a second encoder arranged to process downsampled outputs of the first encoder indicative of current encodings of the spatiotemporal features of the current point cloud, wherein the second encoder process the current encodings together with corresponding encodings of the previous point clouds determined during the previous iteration.

* * * * *